US011591528B2

(12) United States Patent
Karl et al.

(10) Patent No.: US 11,591,528 B2
(45) Date of Patent: Feb. 28, 2023

(54) LOW-PRESSURE CATALYTIC CONVERSION OF USED MOTOR OIL TO DIESEL FUEL

(71) Applicant: Karl IP Holdings Inc., Calgary (CA)

(72) Inventors: Bryce Karl, Longview (CA); Hamid Arabshahi, Calgary (CA)

(73) Assignee: Karl IP Holdings Inc., Calgary (CA)

( * ) Notice: Subject to any disclaimer, the term of this patent is extended or adjusted under 35 U.S.C. 154(b) by 165 days.

(21) Appl. No.: 16/954,154

(22) PCT Filed: Dec. 13, 2018

(86) PCT No.: PCT/IB2018/001611
§ 371 (c)(1),
(2) Date: Jun. 15, 2020

(87) PCT Pub. No.: WO2019/116108
PCT Pub. Date: Jun. 20, 2019

(65) Prior Publication Data
US 2021/0163830 A1   Jun. 3, 2021

Related U.S. Application Data

(60) Provisional application No. 62/640,452, filed on Mar. 8, 2018, provisional application No. 62/598,279, filed on Dec. 13, 2017.

(51) Int. Cl.
*C10G 55/06* (2006.01)
*C10L 1/08* (2006.01)

(52) U.S. Cl.
CPC .............. *C10G 55/06* (2013.01); *C10L 1/08* (2013.01); *C10G 2300/1007* (2013.01);
(Continued)

(58) Field of Classification Search
CPC ................... C10G 55/06; C10G 11/00; C10G 2300/1007; C10G 2300/202;
(Continued)

(56) References Cited

U.S. PATENT DOCUMENTS

| 2,897,147 A | 7/1959 | Lely et al. |
| 3,923,643 A | 12/1975 | Lewis et al. |

(Continued)

FOREIGN PATENT DOCUMENTS

| CN | 101362982 | 2/2009 |
| EP | 893093609 A2 | 3/1990 |

(Continued)

OTHER PUBLICATIONS

Balat, Mustafa. "Diesel-Like Fuel Obtained by Catalytic Pyrolysis of Waste Engine Oil." Energy Exploration & Exploitation, vol. 26, No. 3, 2008, pp. 197-208., doi:10.1260/014459808786933735.

(Continued)

*Primary Examiner* — Ellen M McAvoy
*Assistant Examiner* — Chantel L Graham
(74) *Attorney, Agent, or Firm* — John A. Fortkort; Fortkort & Houston PC

(57) ABSTRACT

A method is provided for reprocessing a petroleum-based waste oil feedstock into diesel fuel. The method includes forming a treated feedstock by (a) filtering the feedstock, thereby removing solids and metals from the feedstock, and (b) dehydrating the feedstock; vaporizing the treated feedstock to produce an oil vapor; passing the oil vapor through at least one catalyst bed and subsequently through a cooler, thereby converting the oil vapor to a hydrocarbon liquid product with a diesel product boiling point range; and removing contaminants from the hydrocarbon liquid product, wherein the contaminants are selected from the group consisting of particulates and color precursors.

31 Claims, 1 Drawing Sheet

(52) U.S. Cl.
CPC . *C10G 2300/202* (2013.01); *C10G 2300/205* (2013.01); *C10G 2300/208* (2013.01); *C10G 2400/04* (2013.01); *C10L 2200/0446* (2013.01); *C10L 2270/026* (2013.01); *C10L 2290/06* (2013.01); *C10L 2290/08* (2013.01); *C10L 2290/141* (2013.01); *C10L 2290/542* (2013.01); *C10L 2290/547* (2013.01)

(58) Field of Classification Search
CPC ........ C10G 2300/205; C10G 2300/208; C10G 2400/04; C10G 31/06; C10G 31/09; C10G 45/02; C10L 1/08; C10L 2200/0446; C10L 2270/026; C10L 2290/06; C10L 2290/08; C10L 2290/141; C10L 2290/542; C10L 2290/547; C10M 175/0033; C10M 175/0058; C10M 175/0066; C10M 175/02; C10N 2030/43
See application file for complete search history.

(56) References Cited

U.S. PATENT DOCUMENTS

| | | | |
|---|---|---|---|
| 3,954,602 | A | 5/1976 | Troesch et al. |
| 4,033,859 | A | 7/1977 | Davidson et al. |
| 4,071,438 | A | 1/1978 | O'Blasny |
| 4,101,414 | A | 7/1978 | Kim et al. |
| 4,140,212 | A | 2/1979 | O'Blasny et al. |
| 4,233,140 | A | 11/1980 | Antonelli et al. |
| 4,381,992 | A | 5/1983 | Wood et al. |
| 4,512,878 | A | 4/1985 | Reid et al. |
| 5,049,258 | A | 9/1991 | Keim et al. |
| 5,143,597 | A | 9/1992 | Sparks et al. |
| 5,248,410 | A | 9/1993 | Clausen et al. |
| 5,271,808 | A | 12/1993 | Shurtleff |
| 5,362,381 | A | 11/1994 | Brown et al. |
| 5,885,444 | A | 3/1999 | Wansbrough et al. |
| 5,972,057 | A | 10/1999 | Hayafuji et al. |
| 6,132,596 | A | 10/2000 | Yu |
| 7,473,348 | B2 | 1/2009 | Koch |
| 8,366,912 | B1 | 2/2013 | Macdonald |
| 9,677,013 | B2 | 6/2017 | Macdonald |
| 2011/0036756 | A1* | 2/2011 | White ............... B01J 23/28 208/136 |
| 2014/0202926 | A1 | 7/2014 | Middelton et al. |
| 2020/0283318 | A1* | 9/2020 | Lutterbach ............... C02F 9/00 |

FOREIGN PATENT DOCUMENTS

| | | | |
|---|---|---|---|
| ES | 2170660 | B1 | 8/2002 |
| FR | 2821084 | A1 | 8/2002 |
| WO | 9411471 | A1 | 5/1994 |
| WO | WO-2013049918 | A1 * | 4/2013 ............ C10G 53/08 |
| WO | 2015007343 | A1 | 1/2015 |
| WO | 2018001611 | | 12/2018 |

OTHER PUBLICATIONS

Nenu, Romanus Krisantus Tue, and Hideto Yoshida. "Comparison of Separation Performance between Single and Two Inlets Hydrocyclones." Advanced Powder Technology, vol. 20, No. 2, 2009, pp. 195-202., doi:10.1016/j.apt.2008.08.004.

"Converting Used Engine Oil into Diesel Fuel." Yangjiang, www.yangjiang.us84.supplierlist.net/product_33_ConvertingUsedEngineOilintoDieselFuel.html.

Demirbas, A., et al. "Diesel Fuel From Waste Lubricating Oil by Pyrolitic Distillation." Petroleum Science and Technology, vol. 33, No. 2, 2014, pp. 129-138., doi:10.1080/10916466.2014.955921.

Demirbas, A. "Gasoline-like Fuel from Waste Engine Oil via Catalytic Pyrolysis." Energy Sources, Part A: Recovery, Utilization, and Environmental Effects, vol. 30, No. 16, 2008, pp. 1433-1441., doi:10.1080/15567030701258469.

Aburas, H., et al. "The Pyrolizing of Waste Lubricating Oil (WLO) Into Diesel Fuel Over a Supported Calcium Oxide Additive." Petroleum Science and Technology, vol. 33, No. 2, 2014, pp. 226-236., doi:10.1080/10916466.2014.973604.

"Thermal Cracking of Used Oil to Produce Distillate Gasoil: A Process Overview." The Free Library, https://www.thefreelibrary.com/Thermal+Cracking+of+Used+Oil+to+Produce+Distillate+Gasoil%3A+A+Process...-a060598268.

"Used Motor Oil Cracking Process For Diesel Production." Sun Faith Engineering, Sep. 26, 2013, www.engineeringoil.com/page.php?cateid=1030.

"Used Motor Oil Cracking Process For Diesel Production." Yangjiang, Jul. 30, 2015, www.yangjiang.us84.supplierlist.net/news_15_1_UsedUsedMotorOilCrackingProcessForDieselProduction.html.

"Waste Oil to Diesel Fuel Refinery." Yangjiang, www.yangjiang.us84.supplierlist.net/product_31_WasteoiltoDieselFuelRefinery.html.

* cited by examiner

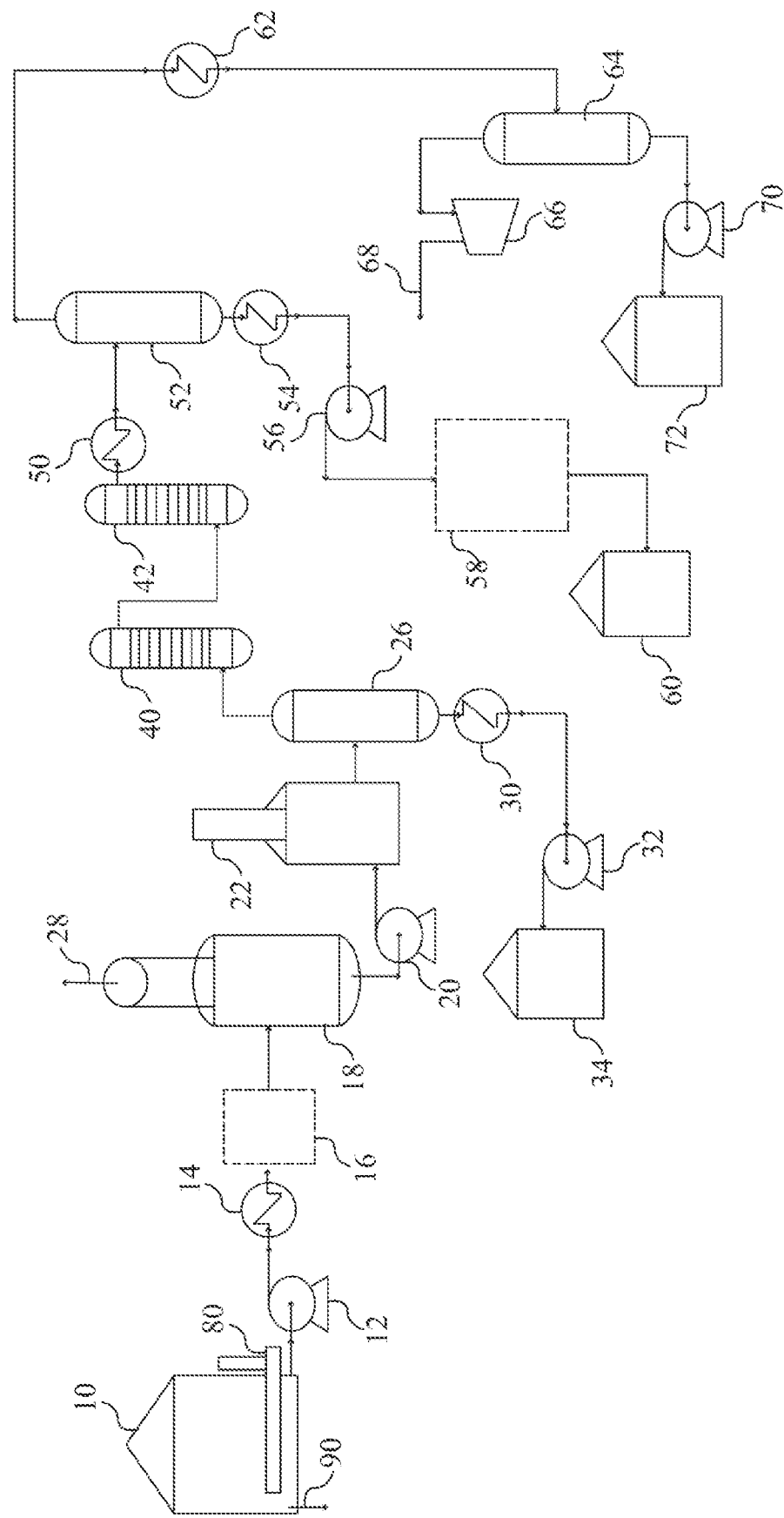

LOW-PRESSURE CATALYTIC CONVERSION OF USED MOTOR OIL TO DIESEL FUEL

CROSS-REFERENCE TO RELATED APPLICATION

This application claims the benefit of priority from U.S. provisional application No. 62/598,279, filed Dec. 13, 2017, having the same inventors and the same title, and which is incorporated herein by referenced in its entirety. This application also claims the benefit of priority from U.S. provisional application No. 62/640,452, filed Mar. 8, 2018, having the same inventors and the same title, and which is incorporated herein by referenced in its entirety.

FIELD OF THE DISCLOSURE

The present disclosure relates generally to processes for catalytically cracking a feedstock, and more particularly to processes for catalytically cracking used motor oil to produce a diesel-like fuel.

BACKGROUND OF THE DISCLOSURE

Lubricating oil (or lube oil) is the highest value component of crude oil. More than half of the global supply of lubricating oil is consumed in the automotive industry, with a large portion of that being consumed as motor oil.

Conventional motor oil comprises nearly 80-90% base oils, with the balance being specialty additives. Oil additives are vital for the proper lubrication and prolonged use of motor oil in modern internal combustion engines. Without suitable additives, oil can become contaminated, break down, leak out, or provide insufficient protection to engine parts over some or all operating temperature ranges. Some of the more important motor oil additives are those which provide proper viscosity and lubricity, contaminant control, resistance to (or control of) chemical breakdown, and seal conditioning. Some additives are specifically designed to permit lubricants to perform better under severe conditions, such as those encountered at extreme pressures and temperatures or high levels of contamination.

The lubricating component in motor oil reduces friction and cools engine moving parts. It typically has a carbon content ranging from C20 to nearly C40, with an initial and end boiling point of approximately 350° C. and 500° C., respectively. During use in an engine, a portion of the motor oil may undergo deterioration due to oxidation and decomposition. Motor oil may also become 'spent' as it accumulates contaminants that interfere with the ability of the oil to adequately lubricate engine parts. Such contaminants may include, for example, sediments, sludge, dirt, shavings, heavy metals, water and engine combustion products.

SUMMARY OF THE DISCLOSURE

In one aspect, a method is provided for reprocessing a petroleum-based waste oil feedstock into diesel fuel. The method includes forming a treated feedstock by (a) filtering the feedstock, thereby removing solids and metals from the feedstock, and (b) dehydrating the feedstock; vaporizing the treated feedstock to produce an oil vapor; passing the oil vapor through at least one catalyst bed and subsequently through a cooler, thereby converting the oil vapor to a hydrocarbon liquid product with a diesel product boiling point range; and removing contaminants from the hydrocarbon liquid product, wherein the contaminants are selected from the group consisting of particulates and color precursors.

BRIEF DESCRIPTION OF THE DRAWINGS

FIG. 1 is an illustration of a preferred embodiment of a method for converting used motor oil into diesel fuel in accordance with the teachings herein.

DETAILED DESCRIPTION

Despite its degradation during use, some components of spent motor oil still retain their basic lubricating properties. Consequently, spent motor oil is regarded as a valuable resource that has both lubricating value and high energy potential. A typical composition of used motor is shown in TABLE 1 below.

TABLE 1

Typical Composition of Used Motor Oil

| Components | Approximate Weight % |
|---|---|
| Water | 2-7 |
| Light Ends | 3-5 |
| Gas Oil | 5-8 |
| Base Oil | 65-75 |
| Residue | 15 |

Used motor oil may be treated to remove contaminants and impurities in a process known as re-refining, where it can be used again as a base stock for new lubricating oil. Re-refining process recovers the lube fraction (sometimes called gas oil) from used motor oil. The recovered gas oil may be fed to a fluid catalytic cracking (FCC) unit or hydrocracker in a refinery to produce gasoline or diesel, or it may be processed in a deep hydro-finishing step to produce ultra-low sulfur diesel.

Used motor oil re-processing refers to methods that convert the used oil to useful product(s) that can be directly burned as a fuel. Known re-processing methods that produce diesel-like fuels from used motor oil typically rely on extreme pressures and temperatures, or use thermal cracking followed by distillation. Examples of such processes are disclosed, for example, in WO94/11471 (Wansbrough et al.), entitled "A Process For Converting Waste Motore Oil To Diesel Fuel", and U.S. 2014/0202926 (Middleton et al.), "System And Method For Processing Diesel Fuel From Waste Oil".

Processes are also known in which waste oil is catalytically cracked in liquid form, and then evaporated to yield hydrocarbon-containing products. An example of such a process is disclosed in WO2015/007343 (Spiess et al.), entitled "Process And Apparatus For Recovery Of A Hydrocarbon-Containing Composition From Residual Materials". The process described therein is said to yield hydrocarbons having 8 to 24 carbon atoms. The resulting hydrocarbon-containing products would appear to contain a mixture of hydrocarbons, some of which are within the proper range for a diesel fuel, and some of which are outside of it. Hence, it would appear that an additional distillation step would be required to produce a diesel fuel with this process.

It has now been found that a diesel fuel may be produced directly from a used motor oil feedstock by a process disclosed herein. In a preferred embodiment, this process involves volatilizing the oil and catalytically cracking the resulting oil vapor. Unlike typical processes in the prior art, this process may be implemented at moderate pressures (e.g., or near atmospheric pressure), and directly yields a hydrocarbon liquid product with a diesel product boiling point range (e.g., diesel fuel) that does not require further distillation. Preferably, the used motor oil feedstock is first treated to remove water and contaminants therefrom, and in some embodiments, the cracked diesel fuel produced by this process may be subsequently passed through a catalyst to remove sulfur content therefrom.

Typical refinery-produced diesel fuel has a cetane of 45, with a boiling range of 180–350° C. The carbon content of diesel generally stretches from C12 to C22, with most carbon molecules being in the C17 to C20 range. However, hydrocarbon liquids may be produced by the processes disclosed herein that have a cetane number in excess of 50.

It is an objective of the present disclosure to convert used motor oil into a diesel fuel product.

In is another object of the present disclosure to convert used motor oil into a low-sulfur diesel fuel product.

It is a further objective of the present disclosure to realize such conversion using a cracking catalyst.

It is another objective of the present disclosure to realize such conversion using a de-sulfurizing catalyst.

It is still another objective of the present disclosure to accomplish such conversion at (or around) ambient pressure.

It is yet another objective of the present disclosure to attain such conversion in a continuous or batch operating mode.

FIG. 1 shows a first particular, non-limiting embodiment of a process in accordance with the teachings herein for converting waste motor oil to diesel fuel. The process depicted may be implemented at a waste oil receiving facility comprising off-loading pumps and a tank farm adapted to accept and store used motor oil. The tank farm may comprise several oil storage tanks 10 for storing used oil. Each oil storage tank 10 is preferably equipped with a fire tube 8 to keep the tank contents warm. The fire tube 8 is preferably equipped with a suitable heat source which may be, for example, natural gas, propane or other commercially-available fuels. The oil storage tanks 10 ay be insulated to conserve energy. A combination of heat and residence time in the oil storage tanks 10 may be utilized to induce the settling of contaminants (typically water and sludge) from the used oil feedstock. The settled contaminants may then be drained through a storage port 6 to a receptacle for suitable treatment or disposal.

The settled oil feedstock produced from the foregoing step is pumped out of the oil storage tanks 10 via a pump 12. This feedstock is then heated in a pre-heater 14 to a suitable temperature (preferably about 100-130° C.) to reduce its viscosity and to facilitate removal of solids (typically suspended solids and metal particles) therefrom. A suitable filtration unit 16 is positioned downstream of preheater 14 to remove these solids from the feedstock, as such materials may impede the effectiveness of subsequent processing steps. Preferably, the filtration unit is adapted to capture particles within the range of about 20 to 100 microns. However, it will be appreciated that this range may be adjusted in some embodiments depending, for example, on the type and particle size distribution of contaminants expected to be encountered in the used motor oil.

In some embodiments, at least one magnetic filtering element may be utilized to remove metal particles from the feedstock. This at least one magnetic filtering element may be implemented as part of the filtration unit, or as one or more separate elements.

The filtered feedstock is directed from the filtration unit 16 to a flash drum 18. Preferably, the filtered feedstock is maintained above the boiling point of water as it flows from the filtration unit 16 to the flash drum 18. More preferably, the filtered feedstock is maintained above the boiling point of water by about 10-40° C. (and most preferably 20-30° C.) as it flows from the filtration unit 16 to the flash drum 18. Thus, for example, in some embodiments, the feedstock may be maintained at a temperature within the range of 110-130° C. during this point in the process. This may be accomplished, for example, by passing the feedstock through a heat exchanger. In some embodiments, the heat exchanger may be integral to the flash tank.

The flash drum 18 preferably operates at nominally atmospheric pressure. Some (and preferably most or all) of any water content in the waste oil is separated from the hydrocarbon component of the oil as water vapor as the oil flashes in the flash drum 18. The water removed may include both free and emulsified water. In some embodiments, water removal may be achieved using at least one process selected from the group consisting of gravity separation, coalescence and centrifugation. The water vapor 28 leaves the top of the flash drum 18, undergoes condensation, and is collected for suitable treatment or disposal. Water removal from the oil feedstock is an important part of preferred embodiments of the processes disclosed herein, and may help to prevent or minimize corrosion in the system.

The dehydrated oil feedstock is pumped from the flash drum 18 via a dry pump 20 into the main heater 22, where the oil is heated to a temperature which is preferably in the range of 380-420° C. The main heater 22 is preferably selected from the group consisting of vertical heaters, box-type heaters, horizontal heaters with an immersed fire tube, and salt-bath type heaters, and has an outlet pressure which is preferably within the range of about atmospheric pressure to 100 kPag, and more preferably within the range of about atmospheric pressure to 50 kPag. A suitable heat source such as, for example, natural gas, propane or liquid fuel, may be used by the main heater. At the heater outlet temperature, a substantial fraction of the oil is turned into vapor, with a small fraction being thermally cracked. Preferably, thermal cracking of the oil is minimized, and the vapor fraction is maximized by simple heat addition.

The vaporized component of the oil feedstock is flashed in a degasser 26. The degasser 26, which preferably operates at a gauge pressure of approximately 50-100 kpag, separates the vapor from the un-vaporized liquid residue. The liquid residue typically contains heavy hydrocarbons whose properties resemble those of bunker 'C' oil. The liquid residue preferably flows under its pressure head into a residue cooler 30. The residue cooler 30 cools the liquid residue to a temperature which is preferably in the range of 70-90° C., after which the liquid residue is pumped by residue pump 32 to residue tank 34.

The hot vapor exiting the degasser is led into a first series of catalyst beds 40, 42 wherein the vaporized oil is catalytically cracked to produce a gaseous diesel fuel. Without wishing to be bound by theory, catalytic cracking of the oil vapor is believed to occur in the gas phase inside the catalyst beds 40, 42, where large chain molecules of motor oil are broken into smaller molecules in the carbon range corresponding to diesel. In a preferred embodiment, main heater 22 is equipped with an outlet, and the first series of catalyst beds is operated at a temperature no lower than the heater outlet temperature.

In some embodiments, the catalyst beds 40, 42 may be followed by one or more de-sulfurizing catalyst beds in which the sulfur content of the cracked diesel product is further lowered to a desired range. In such embodiments, the sulfur content of the hydrocarbon liquid product may be reduced by passing the hydrocarbon liquid product through a second set of catalyst beds comprising a second catalyst, thereby obtaining a reduced sulfur hydrocarbon liquid. Preferably, the reduced sulfur hydrocarbon liquid contains no more than 15 ppm sulfur.

The gaseous diesel leaving the catalyst beds is condensed in a diesel gas cooler 50 to a temperature which is preferably within the range of about 200-230° C., and is allowed to separate from lighter hydrocarbons in a flash drum. Preferably, non-condensed gases from diesel separation are condensed, separated from light gases, and collected as light fuel oil byproducts. Preferably, light gases separated from light fuel oil byproducts are collected, pressurized and recycled for re-use in the plant fuel gas system.

Liquid diesel collected in the bottom of the flash drum flows to a diesel cooler 54, where it is cooled to a temperature that is preferably within the range of about 50-80° C. before being pumped via pump 56 to a polishing unit 58 and into a tank 60. The polishing unit 58 filters out contaminants, suspended solids and unwanted color precursors from the diesel product that may destabilize the diesel upon storage in the tank. In some embodiments, the polishing unit consists of a filter packed with at least one polishing material selected from the group consisting of activated clay, bentonite and granulated bauxite. In other embodiments, the polishing unit is a mix tank, and the at least one polishing material is batched into the mix tank. The polishing unit may further comprise filter elements (which preferably capture particles of 1 to 10 microns), or a chemical injection package in which a stabilizer chemical may be dosed in with diesel oil to avoid precipitation in diesel tank.

The lighter hydrocarbons are further cooled in a lights cooler 62, preferably to a temperature within the range of about 40-50° C. Since there may still be some lighter hydrocarbon gases that have not condensed, the outlet stream from the lights cooler is allowed to flash in a lights flash drum 64 in which the light gases are separated from the condensed liquid. The remaining liquid is typically a mixture of naphtha, gasoline- and kerosene-type fuels (what is referred to as NGK), and is typically characterized by a low cetane number and high aromatic content. This liquid is pumped via pump 70 to tank 72 for storage.

The light gases from lights flash drum are routed to a light gas blower 66, where they are preferably pressurized to the pressure of the fuel gas system of the processing plant. The pressurized gases stream 68 may then be mixed with the plant fuel gas stream and processed in the plant.

One skilled in the art will appreciate that various modifications may be made to the foregoing process without departing from the scope of the present disclosure. For example, various dehydration means may be utilized to remove water content from the oil feedstock prior to catalytic cracking. These include, but are not limited to, the use of suitable desiccants. The choice of dehydration means may depend, for example, on the expected composition of the used oil feedstock.

Moreover, while the systems and methodologies described herein are preferably utilized to derive a diesel fuel from the used motor oil feedstock, it will be appreciated that these systems and methodologies may be modified (for example, through the choice of a suitable catalyst) to yield other hydrocarbon liquids of desired profiles such as, for example, those in which the predominant product is octane. Similarly, one skilled in the art will appreciate that the systems and methodologies described herein may be applied to various other feedstocks besides used motor oil.

The systems and methodologies disclosed herein may be implemented in various modes. These include, without limitation, their implementation in continuous, semi-continuous or batch processing modes.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for reprocessing a petroleum-based waste oil feedstock into diesel fuel, comprising:
   forming a treated feedstock by (a) filtering the feedstock, thereby removing solids and metals from the feedstock, and (b) dehydrating the feedstock;
   vaporizing the treated feedstock to produce an oil vapor;
   passing the oil vapor through a first set of catalyst beds and subsequently through a cooler, thereby converting the oil vapor to a hydrocarbon liquid product with a diesel product boiling point range; and
   removing contaminants from the hydrocarbon liquid product, wherein the contaminants are selected from the group consisting of particulates and color precursors.

2. The method of claim 1, wherein the reprocessing is achieved using an operating mode selected from the group consisting of continuous, semi-continuous and batch operating modes.

3. The method of claim 1, wherein filtering the feedstock includes passing the feedstock through filter elements that capture particles within the range of 20 to 100 microns.

4. The method of claim 3, wherein filtering the feedstock includes removing metal particles from the feedstock with at least one magnetic filter element.

5. The method of claim 1, wherein dehydrating the feedstock includes heating the feedstock above the boing point of water.

6. The method of claim 1, wherein dehydrating the feedstock includes heating the feedstock to a temperature within the range to 110-130° C.

7. The method of claim 1, wherein dehydrating the feedstock includes removing both free and emulsified water from the feedstock.

8. The method of claim 5, wherein dehydrating the feedstock includes:
   passing the feedstock through an oil heat exchanger, and placing the feedstock in a flash tank operating at near atmospheric pressure.

9. The method of claim 8, wherein heating the feedstock generates process waste heat, and further comprising:
   utilized at least a portion of the process waste heat in the oil heat exchanger.

10. The method of claim 8, where the oil heat exchanger is integral to the flash tank.

11. The method of claim 1, where dehydration is achieved using at least one process selected from the group consisting of gravity separation, coalescence and centrifugation.

12. The method of claim 1, wherein vaporizing the treated feedstock includes subjecting the treated feedstock to flash vaporization in a heater operating with an outlet pressure within the range of atmospheric pressure to 100 kPag.

13. The method of claim 1, wherein vaporizing the treated feedstock includes subjecting the treated feedstock to flash vaporization in a heater operating with an outlet pressure within the range of atmospheric pressure to 50 kPag.

14. The method of claim 5, where the feedstock is heated with a heater selected from the group consisting of vertical heaters, box-type heaters, horizontal heaters with an immersed fire tube, and salt-bath type heaters.

15. The method of claim 14, wherein the heater is equipped with an outlet, and wherein the catalyst bed is operated at a temperature no lower than the heater outlet temperature.

16. The method of claim 1, wherein the at least one catalyst bed includes a plurality of catalyst beds arranged in a series flow configuration or in a parallel flow configuration.

17. The method of claim 1, where cracked gas from the at least one catalyst bed is condensed and separated from non-condensed gases to produce diesel oil.

18. The method of claim 1, where the diesel oil passes through a polishing unit which removes contaminants, suspended solids, and color precursors therefrom.

19. The method of claim 18, where the polishing unit consists of a filter packed with at least one polishing material selected from the group consisting of activated clay, bentonite and granulated bauxite.

20. The method of claim 18, where the polishing unit is a mix tank, and wherein the at least one polishing material is batched into the mix tank.

21. The method of claim 18, where the polishing unit further comprises filter elements which capture particles of 1 to 10 microns.

22. The method of claim 18, where the polishing unit further comprises a chemical injection package in which a stabilizer chemical can be dosed in with diesel oil to avoid precipitation in diesel tank.

23. The method of claim 16, where non-condensed gases from diesel separation are condensed, separate from light gases, and collected as light fuel oil byproducts.

24. The method of claim 23, where light gases separated from light fuel oil byproducts are collected, pressurized and recycled for re-use in the plant fuel gas system.

25. The method of claim 16, where the coolant to cracked gas condenser is supplied by a thermal fluid.

26. The method of claim 1, wherein the first set of catalyst beds comprises a first catalyst, and further comprising:
reducing the sulfur content of the hydrocarbon liquid product by passing the hydrocarbon liquid product through a second set of catalyst beds comprising a second catalyst, thereby obtaining a reduced sulfur hydrocarbon liquid.

27. The method of claim 26, wherein the reduced sulfur hydrocarbon liquid contains no more than 15 ppm sulfur.

28. The method of claim 12, wherein vaporizing the treated feedstock produces a vaporized, treated feedstock and a non-vaporized residue, and further comprising:
separating the vaporized, treated feedstock from the residue in a device selected from the group consisting of flash drums and degassers.

29. The method of claim 1, wherein the first set of catalyst beds contains a cracking catalyst.

30. The method of claim 1, wherein the step of passing the oil vapor through a first set of catalyst beds and subsequently through a cooler, thereby converting the oil vapor to a hydrocarbon liquid product with a diesel product boiling point range does not involve distillation.

31. The method of claim 30, wherein said hydrocarbon liquid product has a cetane number in excess of 50.

* * * * *